UNITED STATES PATENT OFFICE.

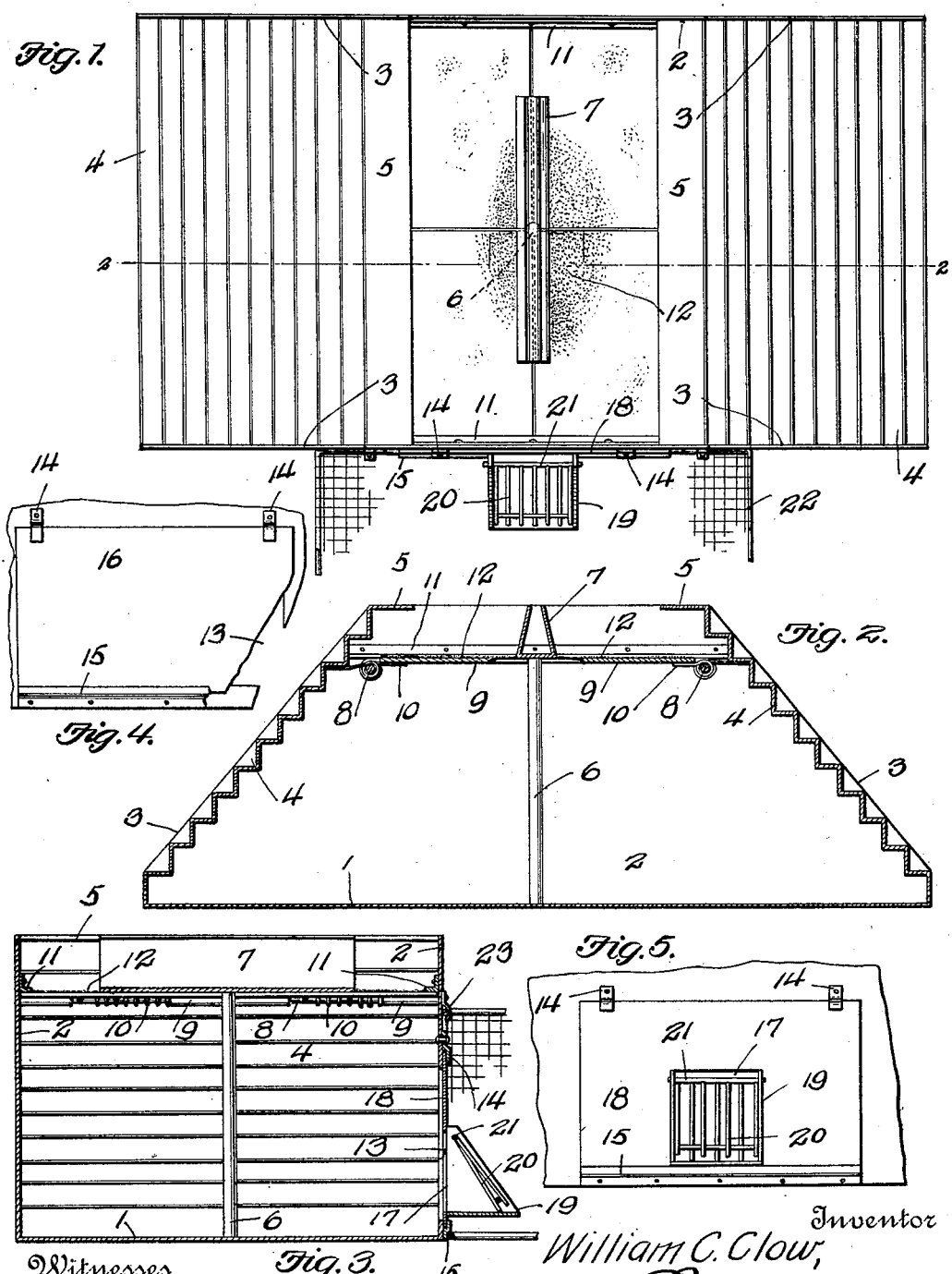

WILLIAM COOPER CLOW, OF PORTLAND, OREGON, ASSIGNOR OF ONE-HALF TO CALLEST STANISLAUS DUNNING, OF PORTLAND, OREGON.

ANIMAL-TRAP.

999,751.            Specification of Letters Patent.        Patented Aug. 8, 1911.

Application filed June 17, 1910. Serial No. 567,516.

*To all whom it may concern:*

Be it known that I, WILLIAM COOPER CLOW, a citizen of the United States, residing at Portland, in the county of Multnomah and State of Oregon, have invented a new and useful Animal-Trap, of which the following is a specification.

This invention relates to animal traps, and the object of the invention is to produce a trap which will automatically reset itself after it has been operated by the entrance of an animal, and in which the bait will be supported in such a position that it cannot be reached by the animal, although in plain sight.

A further object of the invention is to provide a trap in which the animal may be prevented from escaping but may be permitted to pass into a cage or other receptacle to be subsequently destroyed.

The invention further seeks to improve the construction and operation of traps whereby the cost of production will be reduced and the effectiveness of the trap increased.

All these objects, and such other objects as will hereinafter incidentally appear, are attained in the use of the device illustrated in the accompanying drawing, and the invention consists in certain novel features which will be first fully described and then pointed out in detail in the appended claims.

In the drawing,—Figure 1 is a plan view of a trap embodying my invention. Fig. 2 is a vertical longitudinal section of the same. Fig. 3 is a vertical transverse section thereof. Fig. 4 is a detail elevation of a releasing door, and Fig. 5 is a detail elevation of another form of door.

In carrying out my invention, I employ a body having an imperforate continuous bottom 1, and having side walls 2, the end edges of which converge upwardly, as shown at 3. The end walls of the body are constructed to present a series of steps 4 which extend to small platforms 5 arranged in the plane of the upper edges of the side walls, the top of the trap being open, as clearly shown in Fig. 2. Upon the bottom 1, at the center of the same, I erect a standard or post 6 upon the upper end of which is secured a bait holder 7 consisting of normally converging resilient jaws between which the bait is clamped, as will be readily understood. Between the side walls 2, approximately in the plane of the base of the bait holder and adjacent the end walls of the trap, I secure the transverse rods 8 upon which doors 9 are hinged, springs 10 being coiled around the said rods and having their opposite ends bearing against the steps 4 and the under sides of the doors so as to hold the doors normally in a raised position. The doors are arranged in pairs, one pair being provided on each of the transverse rods 8, and the doors being of such size that the two pair of doors will extend across the top of the trap body so as to close the same, as shown in Figs. 1 and 2, when all the doors are in their upper positions. As shown most clearly in Fig. 1, the inner corners of all the doors impinge against the under side of the bait holder which, consequently, serves as a stop to limit the upward movement of the doors, and this upward movement is further limited by cleats 11 on the inner faces of the side walls of the body against which the outer ends of the doors impinge under the influence of the springs, as will be readily understood. The upper surfaces of the doors are preferably coated with sawdust or similar material, as indicated at 12, in order to overcome the polish of the metal and thereby aid in deceiving the animal and inducing him to reach or jump for the bait which is secured in the bait holder 7 midway between the two platforms 5.

In one side wall of the trap body, I provide an opening 13 which constitutes an exit for the trap and also facilitates the cleaning of the same. Upon the outer face of the said side wall, above this opening 13, I provide buttons 14 and below the said opening I provide a cleat or guide 15, a door 16 being supported in the said guide and held against the side wall of the body by the buttons 14, as clearly shown in Fig. 4. This door may be a solid, continuous door, as shown in Fig. 4, or it may be constructed as shown in Figs. 1, 3 and 5, in which a small opening 17 is provided in the door, indicated at 18, and upon the door around the said opening a runway or trough 19 is secured. Between the sides of this runway, I arrange a gate 20 which is preferably in the form of a grating and is provided at its upper end with a rod 21 having its ends pivoted or journaled in the side walls of the runway or trough, as clearly shown in Fig. 1. When this gate and the door 18 are employed, the trap will be provided with a cage or other receptacle 22 held to its side wall by buttons or similar devices 23 and surrounding the runway 19 so that when an animal emerges therefrom, he will be prevented from escaping by reason of the cage or receptacle 22.

In the drawings I have indicated a portion of a woven wire receptacle, but it will be understood, of course, that the receptacle may take any form and may be a vessel filled with water so that the animal will, immediately upon issuing from the runway 19, drop into the water and be drowned. When the woven wire cage indicated is used, the animals will be retained in the cage until such time as the owner may see fit to remove the cage and destroy the animals.

Upon referring to Figs. 1 and 3, it will be noted that the gate 20 is longer than the height of the trough or runway 19 so that it will rest upon the bottom of the said runway in an inclined position, and may be readily moved upward by the body of the escaping animal, but will immediately drop into the position illustrated after the animal passes so that he cannot pass back into the body of the trap, but will be positively caught and retained in the cage or other receptacle. The operation of the trap is thought to be evident. Bait is placed in the bait holder and the trap then arranged at the point where the animals generally commit their depredations. The animal will be attracted by the smell of the bait and will readily ascend the steps 4 so as to attempt to reach the bait, the platforms 5 terminating at a distance from the bait and the space between the said platforms and the bait being open, the animal will drop upon the doors 9, and these doors will immediately give way under the weight of the animal so as to precipitate him into the body of the trap. The springs 10 will immediately return the door to its normal position, and any effort of the animals to open the door from below will be prevented by reason of the engagement of the door against the under side of the bait holder and the cleat 11.

My device is obviously simple and inexpensive in its construction, and requires no attention on the part of the owner except to destroy the rats or other animals caught by the trap.

The bait holder is firmly secured at a point where it will be out of reach of the animals, although it will be outside the trap where it will attract the animals by its odor and by its exposure, and the effort of the animal to reach the bait will result in certain capture.

It will be noted that the doors are located below the upper platforms and the upper edge of the bait holder so that the efforts of the animal to reach the bait will cause him to jump upon the doors and thereby positively operate the same against the tension of the springs acting thereon so that the bait will not be touched and the animal cannot escape.

While I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. A trap comprising a body having an open top of substantially rectangular contour, approaches for the top of the trap on opposite sides thereof and terminating in portions in overhanging relation to the open top on opposite sides thereof, a closure for the top of the trap comprising doors opening downwardly and having hinged connections with the body of the trap below and overhung by the overhanging terminal portions of the approaches, said doors having a normal tendency toward the closed position, and a bait holder intermediate of the terminal portions of the approaches and in spaced relation thereto, said bait holder being elongated in a direction parallel with the edges of the approaches and stopping short of the ends of the top, said bait holder having the bait holding portion on substantially the lever of the overhanging terminal portions of the approaches.

2. A trap comprising a body having an open top of substantially rectangular contour, approaches for the top of the trap at opposite sides thereof, a closure for the top of the trap comprising a plurality of doors opening downward and having a normal tendency toward the closed position and together closing in the top of the trap, and a bait holder elongated in a direction parallel with the edges of the top to which the approaches lead, said bait holder stopping short of the ends of the top and constituting a stop member for the doors when in the closed position.

3. A trap comprising a body having an open top of substantially rectangular contour with approaches on opposite sides terminating at opposite edges of the opening at the top, an intermediately disposed elongated bait holder supported from within the trap and in substantially parallel relation with the sides of the trap where terminate the approaches, said bait holder stopping short of the ends of the opening in the top of the trap, and pairs of doors opening downward and having a normal tendency to move upward, said doors constituting a closure for the top of the trap and having their free edges normally engaging under the bait holder.

4. The combination with a trap body having an opening in its side wall, of a door slidably mounted on the side of the body and provided with a smaller opening, a runway carried by the said door coincident with said opening, and a gate pivotally mounted between the sides of said runway and held by gravity against the bottom of the runway.

5. The combination with a trap body, of a post or standard mounted centrally within the body, a bait holder secured on the upper end of the said post and consisting of a pair of resilient clamping jaws, and downwardly opening doors mounted between the side walls of the trap body and adapted to impinge against the under side of the bait holder.

6. The combination of a trap body having an open upper end, steps at the ends of the body leading to the open upper end thereof, platforms at the upper ends of the steps, downwardly opening doors mounted between the side walls of the trap body below the said platforms, and a bait holder disposed between the said platforms out of contact therewith and in approximately the same plane therewith, the said bait holder constituting a stop to limit the upward movement of the doors.

In testimony, that I claim the foregoing, as my own, I have hereto affixed my signature in the presence of two witnesses.

WILLIAM COOPER CLOW.

Witnesses:
A. G. FORBES,
JNO. G. WINTERS.

Copies of this patent may be obtained for five cents each, by addressing the "Commissioner of Patents, Washington, D. C."